May 24, 1960 M. BODIAN 2,937,841
SWINGING HANGER FOR FLUORESCENT LIGHT FIXTURE
Filed Dec. 23, 1957 2 Sheets-Sheet 1

INVENTOR
MARCUS BODIAN
BY
ATTORNEY

May 24, 1960 M. BODIAN 2,937,841
SWINGING HANGER FOR FLUORESCENT LIGHT FIXTURE
Filed Dec. 23, 1957 2 Sheets-Sheet 2
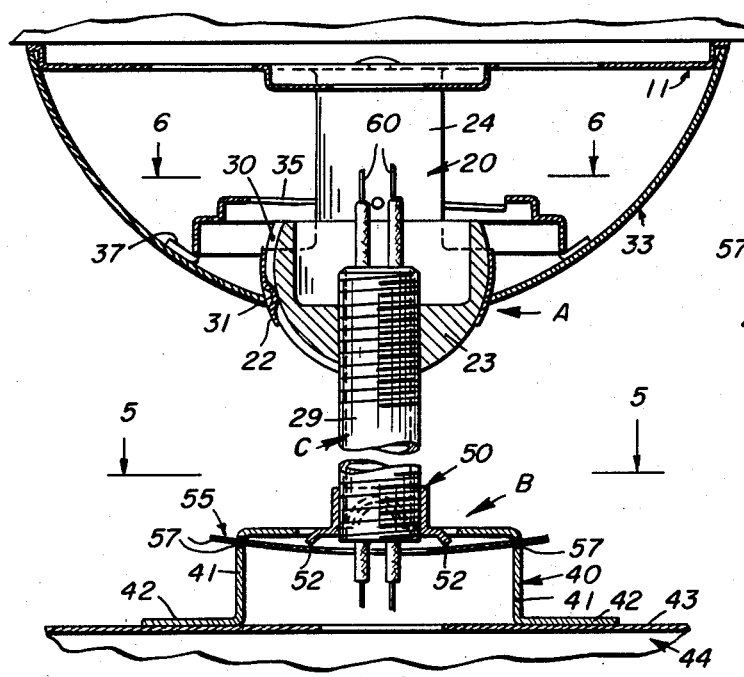
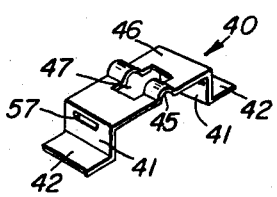
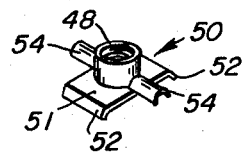
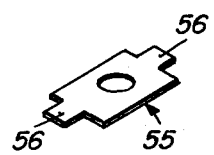
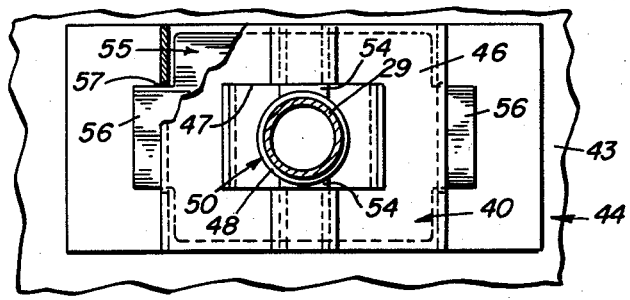
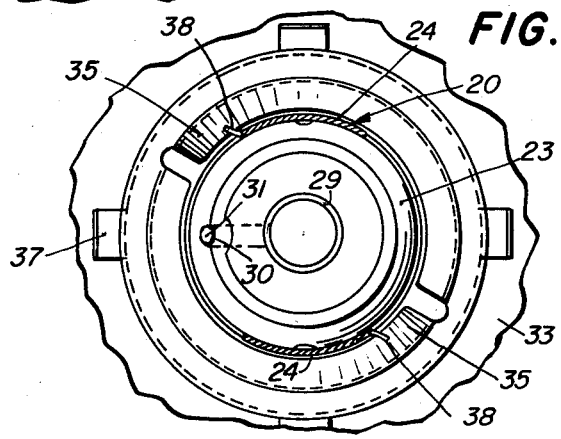
INVENTOR
MARCUS BODIAN
BY
ATTORNEY United States Patent Office 2,937,841
Patented May 24, 1960

2,937,841

SWINGING HANGER FOR FLUORESCENT LIGHT FIXTURE

Marcus Bodian, Los Angeles, Calif., assignor to Sunbeam Lighting Company, Los Angeles, Calif., a firm Filed Dec. 23, 1957, Ser. No. 704,365

6 Claims. (Cl. 248—324)

This invention relates to a stem hanger for a pendant light fixture, and in particular to hanger means for elongated fluorescent light fixtures arranged in end-to-end abutment.

It is common practice to mount elongated fluorescent light fixtures in units in end-to-end relation to form long rows of lighting elements, the units being individually supported from ceiling structural members by hanger rods which have swivel joints at the upper or ceiling ends, and at the lower ends have rigid bolt and nut connection to the fixture. The swivel connection at the upper end permits the hanging rod to assume a vertical position regardless of the angular position of the supporting ceiling members. Under normal conditions the lower rigid connection acts to stabilize the fixture mounting and prevents undue swinging, especially when more than one hanger rod is used to support a single fixture. It has been found that this rigid attachment arrangement becomes very dangerous under earthquake or lateral vibration conditions, particularly when long end-to-end rows of fixtures are so mounted. An end thrust (parallel to the row), will start a longitudinal movement of the whole row as a unit with the result that the rigid bolt connections to the fixtures are literally torn loose. Many fluorescent light units, so mounted and under earthquake movements, have fallen with resulting danger to persons and property below the fixtures. If the disturbing lateral thrust is substantially wholly in the direction at a horizontal right angle to the row of fixtures, each fixture unit merely swings sideways, without causing the cumulative effect which results from an end-to-end thrust. Earthquakes and lateral vibratory thrust with components in the direction of alignment of the row of fixtures, from any cause, may produce these dangerous results.

The general object of this invention, then, is to overcome this potentially dangerous current method of mounting fixtures in a row in end-to-end relation. It is a further object of this invention to provide a hanger which has a swivel connection at one end and a hinge or trunnion connection at the other. Another object is to provide a hanger member having a spring tensioned hinge connection, particularly for the mounting of elongated fluorescent light fixtures disposed in end-to-end relation.

These and other objects are attained by my invention, which will be understood from the following description, reference being made to the accompanying drawings in which:

Fig. 4 is an elevational view partly in section taken in a vertical plane at right angles to the section plane of Fig. 3;

Fig. 5 is a cross-sectional view taken on the line 5—5 of Fig. 4;

Fig. 6 is a cross-sectional view taken on the line 6—6 of Fig. 4;

Fig. 7 is a perspective view of the saddle member of the trunnion joint;

Fig. 8 is a perspective view of the trunnion member; and

Fig. 9 is a perspective view of the plate spring of the trunnion member.

Figure 1:
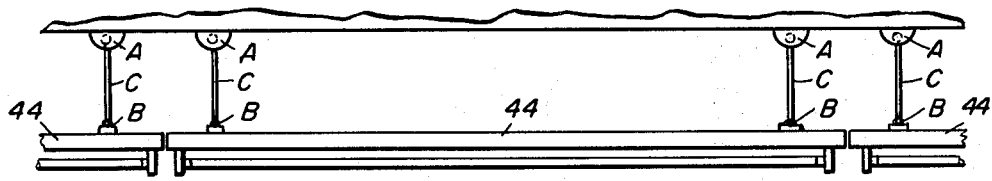
Fig. 1 is a side elevational view of a row of elongated fluorescent light fixtures arranged in abutting end-to-end relation mounted on a ceiling by hanger means following my invention.

Referring to the drawings, the hanger device of this invention consists generally of an upper swivel joint A, a lower spring retarded hinge joint B, and a connecting rod or tube C attached to both joints.

The swivel joint A may be of any suitable construction, the preferred form shown includes generally a ball and socket joint with removable canopy means for covering the swivel joint. This device consists of a base plate 11 which is adapted to be supported on an electric wiring outlet box 12 by means of screws 13 in the threaded ears 14 which are generally provided on the open face of the outlet box. The base plate 11 is provided with a central depressed boss 15 having an opening 16 therethrough for electrical conduits, and diametrically opposed depressed tab pockets 17 with adjoining slot openings 18 disposed away from the central circular depressed boss 15, the pockets 17 being adapted to receive outturned tabs 19 on the socket frame 20. A wedge tab 26 extends into each of the pockets 17 from the base plate at the edge of the depressed central boss 15.

The socket frame 20 consists of a generally cylindrical body, one end of which is drawn in to form a part-spherical socket 22 which is adapted to hold a ball 23. Upper portions of the cylindrical body 21 are cut away in opposite segments to leave opposed legs 24 extending from the upper rim of the socket 22. The legs 24 are curved in horizontal cross-section and disposed apart to fit around the depressed boss 15 on the base plate 11; and each leg at its end is provided with an out- turned tab 19 which is adapted to engage the tab pocket 17 of the base plate. The edge of the circular depressed boss 15 serves as an abutment for the legs, and as a guide in turning the tabs into the pockets. A raised locking lip 27 is provided on the upper face of each of the tabs 19, these lips being adapted to engage the wedge tabs 26 extending toward the tab pockets 17 from the base plate 11 adjacent the inner edge of the tab pockets 17. Each leg 24 is also provided, at positions intermediate the out-turned tabs 19 and the socket, with radial tabs 38 which are adapted to co-act with parts of the canopy 33 as later described. The socket frame 20 is attached to the base plate 11 by rotating the frame around the boss 15 so that the out-turned tabs 19 enter the tab pockets 17 to the bottom of the pockets, at which position the wedge tabs 26 press into struck out locking lip 27 on the out-turned tabs 19, thus securely locking the socket frame 20 to the base plate 11, so that it cannot be loosened by vibration or by a laterally applied force.

The ball 23 which may be of cast metal fits in the socket 22 and is provided with a threadedly attached stem 29 to which the trunnion joint B may be attached at the end opposite the ball. The ball 23 is preferably provided on one side, aligned with the stem, with a peripheral groove 30 which engages a large dimple 31 extending into the socket 22, this arrangement preventing the rotation of the ball in the socket relative to the axis of the stem, but does not prevent the movement of the ball in the socket to position the stem at any depending angle within the range permitted by the lower opening in the socket.

The canopy 33 consists of a hollow metal stamping having a central opening 34 adapted to fit around the lower end of the socket 22. Inside the canopy there is provided a pair of diametrically opposed helical tracks 35 formed from sheet metal on a cylindrical body having attachment tabs 37 which are spot-welded to the inside surface of the canopy. The helical tracks 35 are adapted to engage radial tabs 38 on the legs 24 of the socket frame 20, as previously described. When the canopy is rotated with the helical tracks 35 engaging the radial tabs 38, the rim of the canopy is raised to tightly press against the outer rim of the base plate 11 (or against the ceiling surface), and thus conceals all of the swivel device except the pendant stem 29 and the lower portion of the ball 23.

The spring hinge joint, designated B, consists of a formed sheet metal saddle 40 having vertical legs 41 and out-turned feet 42, which are adapted for fixed attachment, for example, by spot welding to the top housing member 43 of the elongated fixture 44. Downwardly directed bearing grooves 45 are provided centrally across the saddle top plate 46, there being an opening 47 between the bearing grooves 45 for the projection therethrough and movement therein of the stem-connecting collar 48 of the trunnion member 50. The trunnion member 50 consists of a base plate 51 having turned-down rocker edges 52, and a centrally disposed oppositely directed connecting collar 48 for the stem 29, this collar preferably internally threaded to receive the threads 53 on the stem 29. The trunnion member 50 is provided with trunnions 54 extended outwardly on opposite sides of the collar 48, and is held in place with the trunnions 54 engaging the bearing grooves 45 by the flat spring plate 55 which presses up against the rocker edges 52. The spring plate 55 is provided with end tabs 56 which are held in horizontal slots 57 in the legs 41 of the saddle 40.

The stem 29 is preferably tubular so that it may serve as a conduit for the leads 60 which carry the electric current from the wires in the outlet box 12 to the fixture 44.

Figure 2:
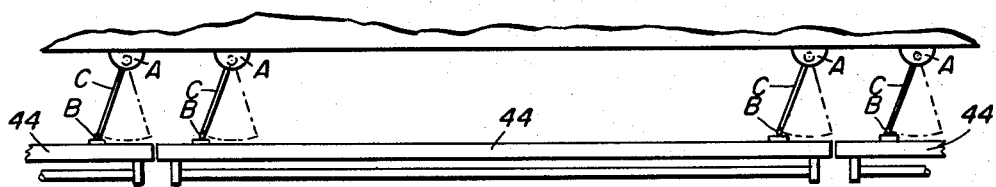
Fig. 2 is a side elevational view similar to Fig. 1 in which the hangers are shown in the positions which they would assume due to a lateral end-to-end thrust such as by earthquake or vibration.
Figure 3:
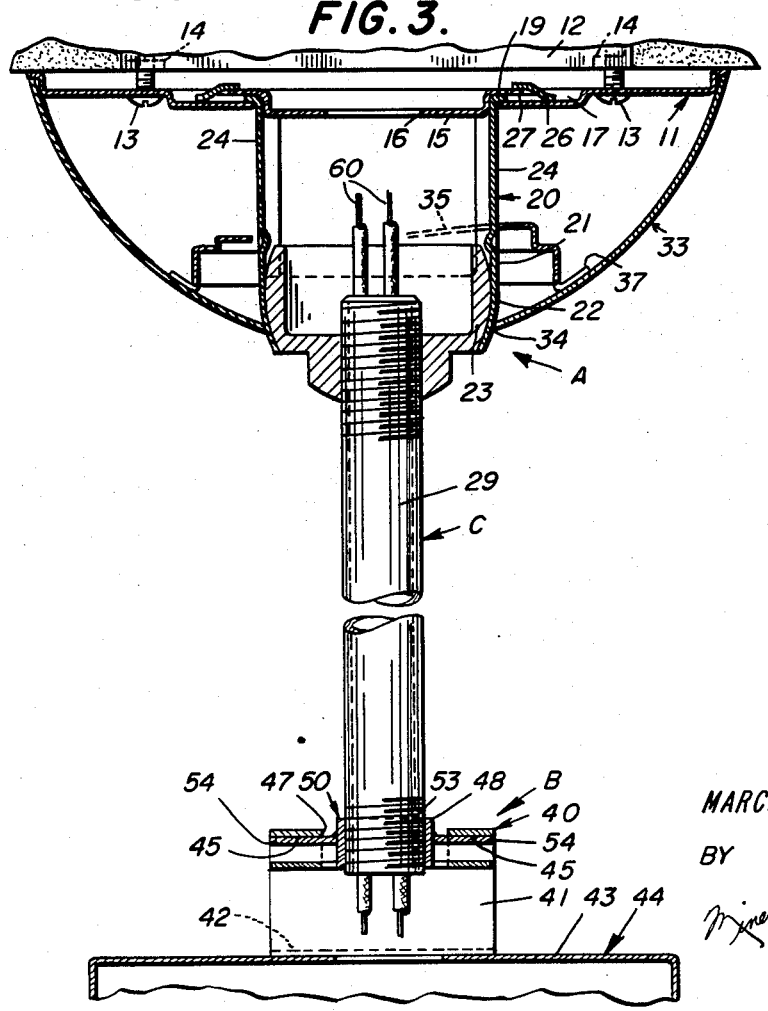
Fig. 3 is an enlarged side elevational view partly in section of a hanger element showing a swivel joint at one end and a spring biased trunnion or hinge joint at the other end.

When the fixtures 44, in end-to-end relation are mounted to the ceiling structure by the hanger devices as described, the fixtures may move sidewise independently because of the swivel connection A at the ceiling end of the stem 29. The longitudinal movement of each fixture in the row is strongly retarded by the spring biased hinge member B, but some longitudinal movement may result, with parallel positioning of the supporting stems 29, as indicated particularly in Fig. 2. This device and arrangement of hangers effectively prevents the rupturing of the usual rigid connection between the stems and the fixture housings. While two-stem hanging means are shown in the drawings, single stems or multiple stems produce the same desirable results when the supporting stems have swivel connections with the ceiling supports, and the fixture connections are hinged for longitudinal swinging, with spring-applied damping means.

The advantages of my hanger device will be apparent from the above description.

I claim:

1. A light fixture hanger comprising an elongated stem; a free swinging swivel joint means attached to the ceiling end of said stem; and a hinging joint means attached to the fixture end of said stem, said hinging joint means comprising a saddle member having a top plate with central aperture and vertical legs, said saddle legs being adapted for rigid attachment to the top member of a fluorescent light fixture; a trunnion member having a base plate with trunnions extending laterally from opposite sides thereof, said base plate extending in both directions and at right angles to said trunnion, said base having an attachment collar extending upwardly through said saddle aperture, said collar engaging the fixture end of said stem, and said trunnions bearing against the underside of the top plate of said saddle.

2. A light fixture hanger comprising an elongated stem; a free swinging swivel joint means attached to the ceiling end of said stem; and a hinging joint means attached to the fixture end of said stem, said hinging joint means comprising a saddle member having a top plate with a central aperture and vertical legs, said saddle legs being adapted for rigid attachment to the top member of a fluorescent light fixture, said top plate being provided with downwardly directed bearing grooves adjacent said aperture; a trunnion member having a base plate with trunnions extending laterally from opposite sides thereof, said base plate extending in both directions and at right angles to said trunnions, said base having an attachment collar extending through said saddle aperture, said collar engaging the fixture end of said stem, and said trunnions engaging the bearing grooves in the top plate of said saddle.

3. A light fixture hanger comprising an elongated stem; a free swinging swivel joint means attached to the ceiling end of said stem; and a hinging joint means attached to the fixture end of said stem, said hinging joint means comprising a saddle member having a top plate with a central aperture and vertical legs, said saddle legs being adapted for rigid attachment to the top member of a fluorescent light fixture; a trunnion member having a base plate with trunnions extending laterally from opposite sides thereof, said base plate extending in both directions and at right angles to said trunnions, said base having an attachment collar extending through said saddle aperture, said collar engaging the fixture end of said stem, the ends of said base plate being turned down to form rocker edges, and plate spring means attached to the legs of said saddle member, said spring means pressing against said rocker edges and holding said trunnions in said bearing grooves.

4. In combination, a row of suspended elongated horizontally disposed fluorescent light fixtures arranged in adjacent end to end relation, and suspension mounting means therefor, said mounting means comprising a pair of hangers attached to each fixture, each hanger being attached at one end to the ceiling and at the other end to the upper surface of said fixture adjacent the ends thereof, each of said hangers consisting of an elongated stem; a free swinging swivel joint means attached to the ceiling end of said stem; and a hinging joint means attached to the fixture end of said stem, said hinging joint means comprising a saddle member having a top plate with central aperture and vertical legs, said saddle legs being adapted for rigid attachment to the top member of a fluorescent light fixture; a trunnion member having a base plate with trunnions extending laterally from opposite sides thereof, said base plate extending in both directions and at right angles to said trunnion, said base having an attachment collar extending upwardly through said saddle aperture, said collar engaging the fixture end of said stem, and said trunnions bearing against the underside of the top plate of said saddle, whereby when actuated the endwise swinging of said row of fixtures is retarded while its lateral swinging is unretarded.

5. In combination, a row of suspended elongated horizontally disposed fluorescent light fixtures arranged in adjacent end to end relation, and suspension mounting means therefor, said mounting means comprising a pair of hangers attached to each fixture, each hanger being attached at one end to the ceiling and at the other end to the upper surface of said fixture adjacent the ends thereof, each of said hangers consisting of an elongated stem; a free swinging swivel joint means attached to the ceiling end of said stem; and a hinging joint means comprising a saddle member having a top plate with a central aperture and vertical legs, said saddle legs being adapted for rigid attachment to the top member of a fluorescent light fixture, said top plate being provided with downwardly directed bearing grooves adjacent said aperture; a trunnion member having a base plate with trunnions extending laterally from opposite sides thereof, said base plate extending in both directions and at right angles to said trunnions, said base having an attachment collar extending through said saddle aperture, said collar engaging the fixture end of said stem, and said trunnions engaging the bearing grooves in the top plate of said saddle, whereby when actuated the endwise swinging of said row of fixtures is retarded while its lateral swinging is unretarded.

6. In combination, a row of suspended elongated horizontally disposed fluorescent light fixtures arranged in adjacent end to end relation, and suspension mounting means therefor, said mounting means comprising a pair of hangers attached to each fixture, each hanger being attached at one end to the ceiling and at the other end to the upper surface of said fixture adjacent the ends thereof, each of said hangers consisting of an elongated stem; a free swinging swivel joint means attached to the ceiling end of said stem; and a hinging joint means attached to the fixture end of said stem, said hinging joint means comprising a saddle member having a top plate with a central aperture and vertical legs, said saddle legs being adapted for rigid attachment to the top member of a fluorescent light fixture; a trunnion member having a base plate with trunnions extending laterally from opposite sides thereof, said base plate extending in both directions and at right angles to said trunnions, said base having an attachment collar extending through said saddle aperture, said collar engaging the fixture end of said stem, the ends of said base plate being turned down to form rocker edges, and plate spring means attached to the legs of said member, said spring means pressing against said rocker edges and holding said trunnions in said bearing grooves, whereby when actuated the endwise swinging of said row of fixtures is retarded while its lateral swinging is unretarded.

References Cited in the file of this patent

UNITED STATES PATENTS

| | | |
|---|---|---|
| 719,013 | Kerr | Jan. 27, 1903 |
| 974,253 | Forg | Nov. 1, 1910 |
| 1,630,703 | James | May 31, 1927 |
| 2,115,898 | Zagora | May 3, 1938 |
| 2,636,759 | Rueb | Apr. 28, 1953 |
| 2,867,404 | Ramsing | Jan. 6, 1959 |